(12) United States Patent
Gearhart

(10) Patent No.: US 8,151,916 B2
(45) Date of Patent: Apr. 10, 2012

(54) ENERGY MANAGEMENT SYSTEM AND METHOD FOR HYBRID ELECTRIC VEHICLES

(75) Inventor: Chris Conway Gearhart, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 590 days.

(21) Appl. No.: 12/360,088

(22) Filed: Jan. 26, 2009

(65) Prior Publication Data

US 2010/0187030 A1  Jul. 29, 2010

(51) Int. Cl.
*B60W 10/00* (2006.01)
*B60W 20/00* (2006.01)

(52) U.S. Cl. ................ 180/65.265; 180/65.21

(58) Field of Classification Search ........... 180/65.21, 180/65.24, 65.265, 65.275, 65.28, 65.285, 180/65.29; 701/36, 99
See application file for complete search history.

(56) References Cited

U.S. PATENT DOCUMENTS

| | | | | |
|---|---|---|---|---|
| 5,495,912 A * | 3/1996 | Gray et al. | | 180/165 |
| 6,112,151 A | 8/2000 | Kruse | | |
| 6,176,807 B1 * | 1/2001 | Oba et al. | | 477/5 |
| 6,422,001 B1 * | 7/2002 | Sherman et al. | | 60/274 |
| 6,945,029 B2 * | 9/2005 | Viteri | | 60/39.17 |
| 7,290,504 B2 * | 11/2007 | Lange | | 123/1 A |
| 7,399,325 B1 * | 7/2008 | Redmond | | 48/61 |
| 7,451,839 B2 * | 11/2008 | Perlman | | 180/2.1 |
| 7,779,943 B2 * | 8/2010 | Seidel et al. | | 180/65.29 |
| 7,808,118 B2 * | 10/2010 | Berkson | | 290/40 R |
| 8,020,596 B1 * | 9/2011 | Morrison | | 152/340.1 |
| 2004/0144107 A1 * | 7/2004 | Breton et al. | | 62/129 |
| 2005/0229872 A1 * | 10/2005 | Lange | | 123/3 |
| 2007/0278795 A1 * | 12/2007 | Berkson | | 290/40 C |
| 2008/0211230 A1 * | 9/2008 | Gurin | | 290/2 |
| 2009/0055304 A1 * | 2/2009 | Lange | | 705/37 |
| 2009/0099887 A1 * | 4/2009 | Sklar et al. | | 705/7 |
| 2009/0144149 A1 * | 6/2009 | Sakakibara et al. | | 705/14 |
| 2009/0144150 A1 * | 6/2009 | Sakakibara et al. | | 705/14 |
| 2010/0076825 A1 * | 3/2010 | Sato et al. | | 705/14.1 |
| 2010/0104392 A1 * | 4/2010 | Bowen et al. | | 410/26 |
| 2010/0288569 A1 * | 11/2010 | Fish | | 180/65.29 |
| 2011/0067390 A1 * | 3/2011 | Cook | | 60/320 |
| 2011/0095538 A1 * | 4/2011 | Tabe | | 290/55 |
| 2011/0098869 A1 * | 4/2011 | Seo et al. | | 700/296 |
| 2011/0168223 A1 * | 7/2011 | Dede et al. | | 136/205 |
| 2011/0204720 A1 * | 8/2011 | Ruiz et al. | | 307/66 |

* cited by examiner

*Primary Examiner* — J. Allen Shriver, II
*Assistant Examiner* — Jacob Meyer
(74) *Attorney, Agent, or Firm* — Dave Kelly; Tung & Associates

(57) ABSTRACT

An energy management system includes a first energy source having a first well-to-wheels greenhouse gas emissions content, a second energy source having a second well-to-wheels greenhouse gas emissions content and a drive mechanism powered by the first energy source and the second energy source. The drive mechanism is powered by the first energy source when the first well-to-wheels greenhouse gas emissions content is less than the second well-to-wheels greenhouse gas emissions content and the drive mechanism is powered by the second energy source when the second well-to-wheels greenhouse gas emissions content is less than the first well-to-wheels greenhouse gas emissions content.

15 Claims, 2 Drawing Sheets

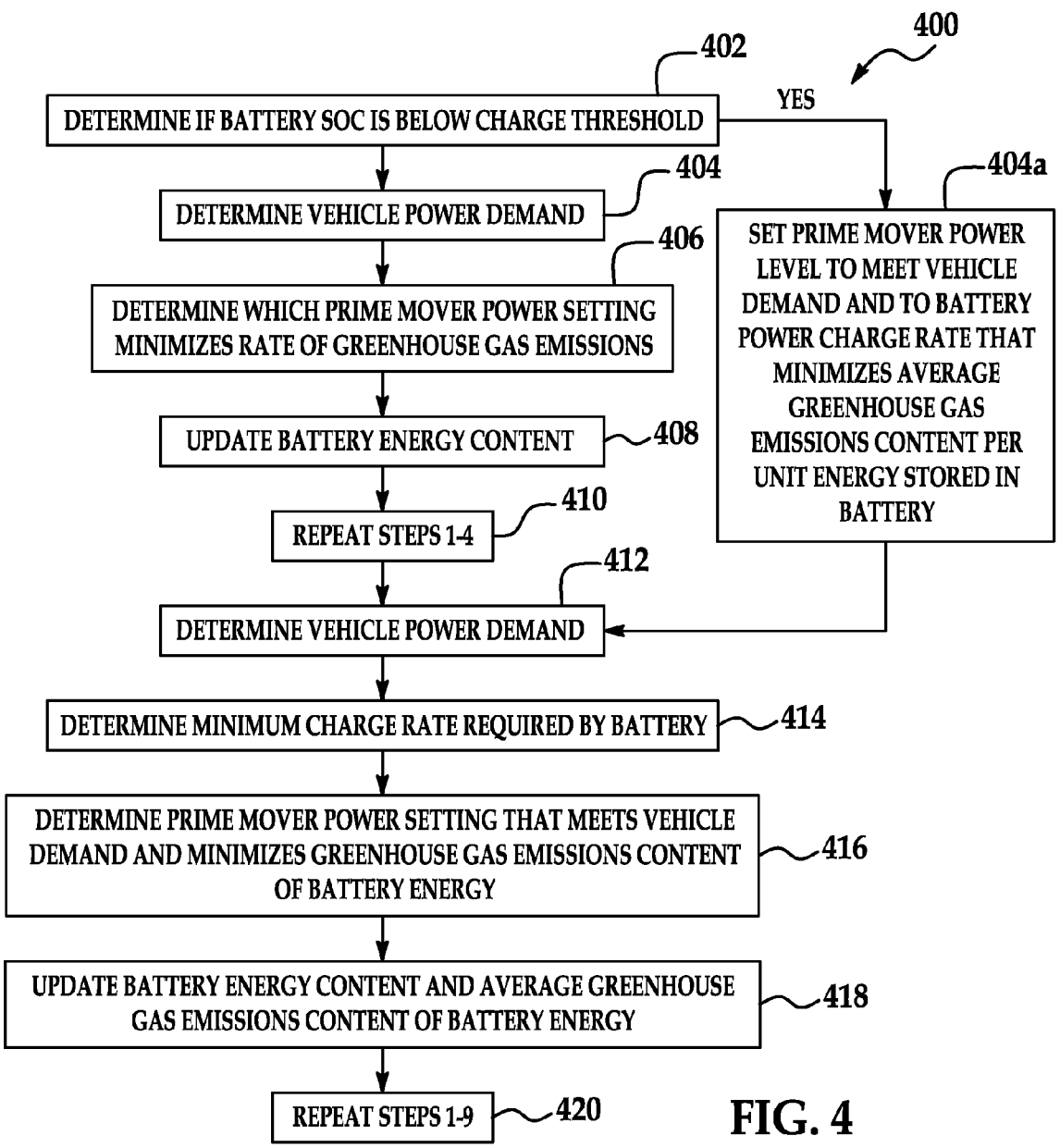

ENERGY MANAGEMENT SYSTEM AND METHOD FOR HYBRID ELECTRIC VEHICLES

FIELD

The present disclosure relates to hybrid electric vehicles. More particularly, the present disclosure relates to an energy management system and method which minimize well-to-wheels greenhouse gas emissions in a hybrid electric vehicle.

BACKGROUND

Carbon dioxide emissions from sources such as internal combustion engines may contribute to global climate change. Therefore, a large-scale reduction in the quantity of carbon dioxide in automobile engine exhaust may provide environmental benefits. The development of electric and hybrid electric vehicles is currently being pursued as a partial solution to the problem of increasing carbon dioxide emissions.

Plug-in hybrid electric vehicles are designed to consume less fuel than conventional vehicles and non plug-in hybrid electric vehicles. In some cases, however, the well-to-wheels greenhouse gas emissions associated with plug-in electric energy may be equal to or greater than the well-to-wheels greenhouse gas emissions of the fuel itself. This is particularly true in cases in which the fuel is a biofuel or hydrogen.

Therefore, an energy management system and method are needed to reduce greenhouse gas emissions of a hybrid electric vehicle by balancing the energy sources which are utilized during operation of the vehicle.

SUMMARY

The present disclosure is generally directed to an energy management system. An illustrative embodiment of the energy management system includes a first energy source having a first well-to-wheels greenhouse gas emissions content, a second energy source having a second well-to-wheels greenhouse gas emissions content and a drive mechanism powered by the first energy source and the second energy source. The drive mechanism is powered by the first energy source when the first well-to-wheels greenhouse gas emissions content is less than the second well-to-wheels greenhouse gas emissions content and the drive mechanism is powered by the second energy source when the second well-to-wheels greenhouse gas emissions content is less than the first well-to-wheels greenhouse gas emissions content.

The present disclosure is further generally directed to an energy management method for minimizing greenhouse gas emissions of a vehicle. An illustrative embodiment of the method includes providing a first energy source; providing a second energy source; determining a first well-to-wheels greenhouse gas emissions content of the first energy source; determining a second well-to-wheels greenhouse gas emissions content of the second energy source; and operating the vehicle using the first energy source when the first well-to-wheels greenhouse gas emissions content is less than the second well-to-wheels greenhouse gas emissions content and operating the vehicle using the second energy source when the second well-to-wheels greenhouse gas emissions content is less than the first well-to-wheels greenhouse gas emissions content.

BRIEF DESCRIPTION OF THE DRAWINGS

The disclosure will now be made, by way of example, with reference to the accompanying drawings, in which:

FIG. 3 is a flow diagram which illustrates recalculation of the average greenhouse gas emissions per unit of electrical energy stored in a hybrid electric vehicle battery upon plug-in recharging of the battery.

FIG. 4 is a flow diagram which illustrates implementation of the energy management system during operation of a hybrid electric vehicle.

DETAILED DESCRIPTION

The present disclosure is generally directed to an energy management system which reduces greenhouse gas emissions of a hybrid electric vehicle by balancing the electric and fuel energy sources which are utilized during operation of the vehicle. The energy management system maintains a running estimate of the average well-to-wheels greenhouse gas emissions per unit mass of fuel and the average well-to-wheels greenhouse gas emissions per unit of electrical energy stored in the vehicle battery. During fuel fill and plug-in battery charging of the vehicle, the vehicle controller receives information which indicates the greenhouse gas emissions per unit mass of fuel and the greenhouse gas emissions per unit of plug-in electrical energy stored in the vehicle battery. The vehicle controller uses this information to update the running estimate of the greenhouse gas emissions of the fuel and of the plug-in electrical energy. Alternatively, the vehicle controller may use GPS and time information to estimate the greenhouse gas emissions content of the plug-in electrical energy based on regional grid mix averages.

During vehicle operation, the vehicle controller monitors the state of charge of the vehicle battery and the power demand of the vehicle. Using look-up efficiency tables, the vehicle controller determines which of the current running total of greenhouse gas emissions of the fuel energy or of the plug-in electrical energy from the battery is higher. Using this information, the vehicle controller adjusts the power distribution between the fuel energy and the plug-in electrical energy to power the vehicle in such a manner as to minimize the greenhouse gas emissions consistent with other constraints on vehicle performance.

Also during vehicle operation, the average well-to-battery greenhouse gas emissions per unit of electrical energy stored in the vehicle battery may be continuously updated to account for charging and discharging of the battery. When the battery is charging during vehicle operation, the vehicle controller sets the power of the engine, fuel cell or other prime mover to charge the battery in such a manner as to minimize the average greenhouse gas emissions content per unit of electrical energy stored in the battery. Applied to a plug-in hybrid electric vehicle, the system preferentially uses battery energy in the event that the source of plug-in electrical energy has a lower well-to-wheels greenhouse gas emissions content than the well-to-wheels greenhouse gas emissions content of the fuel. If the battery energy has a higher greenhouse gas emissions content than the greenhouse gas emissions content of the fuel per unit mass of the fuel, then the fuel is consumed under normal vehicle operational conditions and battery energy is used only when necessary to meet power demands.

Figure 1:
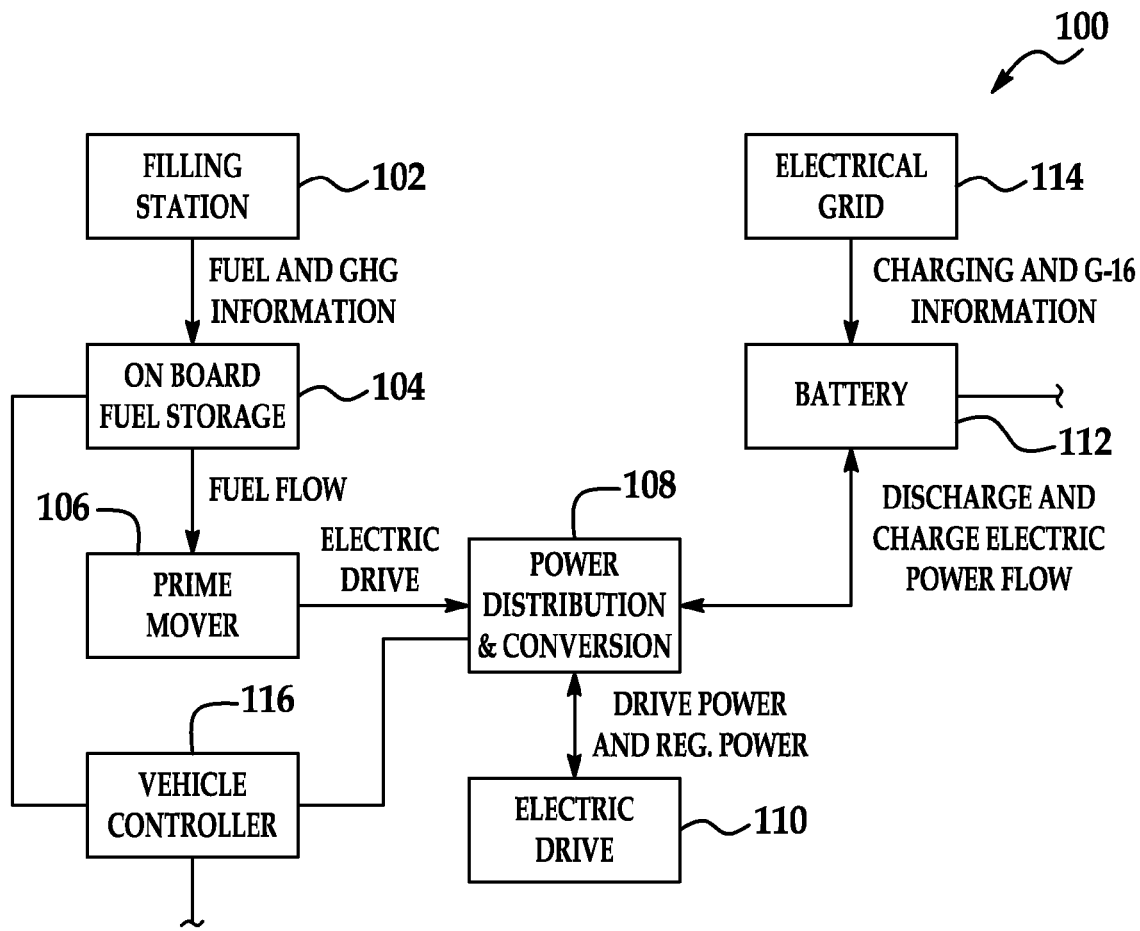
FIG. 1 is a schematic block diagram of an illustrative embodiment of the energy management system for hybrid electric vehicles.

Referring initially to FIG. 1, an illustrative embodiment of the energy management system for hybrid vehicles, hereinafter energy management system, is generally indicated by reference numeral 100. The energy management system 100 includes a filling station (block 102) at which a hybrid electric vehicle (not shown) is refueled. The fuel from the filling station 102 is stored in an onboard fuel storage facility 104 on the hybrid electric vehicle. Fuel from the onboard fuel storage facility 104 is distributed to an internal combustion engine, fuel cell or other prime mover 106 of the hybrid electric vehicle. The prime mover 106 converts chemical energy into electrical energy which is subjected to power distribution and conversion by a power distribution and conversion mechanism 108. The electrical energy from the power distribution and conversion mechanism 108 is operable to drive an electric drive mechanism 110 which propels the vehicle.

The energy management system 100 further includes an electrical grid 114 at which an onboard vehicle battery 112 of the hybrid electric vehicle (not shown) is charged. The onboard vehicle battery 112 may be recharged from the electrical grid 114 using plug-in technology which is known to those skilled in the art. Electric power from the onboard vehicle battery 112 is subjected to power distribution and conversion by the power distribution and conversion mechanism 108. Electric power from the power distribution and conversion mechanism 108 is used to operate the electric drive mechanism 110 of the vehicle. During operation of the hybrid electric vehicle, a portion of the electrical energy from the power distribution and conversion mechanism 108 is used to recharge the onboard vehicle battery 112. A vehicle controller 116 of the hybrid electric vehicle interfaces with the onboard fuel storage facility 104, the power distribution and conversion mechanism 108 and the battery 112.

As fuel from the filling station 102 is stored in the onboard fuel storage facility 104 of the hybrid electric vehicle, information which indicates the greenhouse gas (GHG) emissions that was expended in manufacture and processing of the fuel is received and stored in the onboard vehicle controller 116 of the hybrid electric vehicle. Also, as the onboard vehicle battery 112 is charged from the electrical grid 114, information which indicates the greenhouse gas (GHG) emissions that was expended to generate and store the electrical power in the electrical grid 114 is received and stored in the onboard vehicle controller 116 of the hybrid electric vehicle. During operation of the hybrid electric vehicle, the vehicle controller 116 uses the fuel GHG emissions information and the electrical power GHG emissions information to determine a running total of the GHG emissions which results from consumption of the fuel and the electrical power. The vehicle controller 116 then uses this information to balance the power consumption of the fuel and the electrical power which is used to operate the electric drive mechanism 110 in such a manner as to minimize the greenhouse gas emissions of the hybrid electric vehicle.

Figure 2:
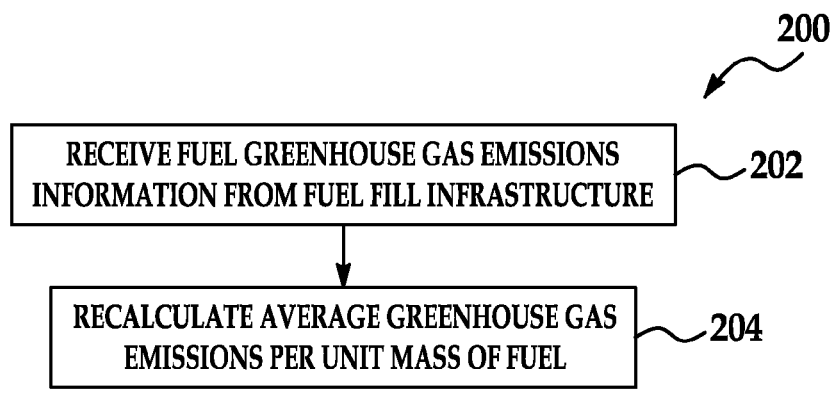
FIG. 2 is a flow diagram which illustrates recalculation of the average greenhouse gas emissions per unit of fuel upon refueling of a hybrid electric vehicle.

Referring next to FIG. 2, a flow diagram 200 which illustrates recalculation of the average greenhouse gas emissions per unit of fuel upon refueling of the hybrid electric vehicle at the filling station 102 (FIG. 1) is shown. In block 202, during refueling of the hybrid electric vehicle, the vehicle controller receives fuel greenhouse gas (GHG) emissions information from a fuel fill infrastructure at the filling station 102 (FIG. 1). The fuel GHG emissions information may include, for example, the greenhouse gas emissions per kilogram of fuel delivered ($G_{F\_del}$) and the total mass of fuel delivered ($M_{F\_del}$). In block 204, the average greenhouse gas emissions per unit mass of fuel ($G_F$) after filling of the vehicle is recalculated according to the formula:

$$G_{F\_post\_fill}=(G_{F\_pre\_fill}M_{F\_pre\_fill}+G_{F\_del}M_{F\_del})/M_{F\_pre\_fill}+M_{F\_del}$$

Referring next to FIG. 3, a flow diagram 300 which illustrates recalculation of the average greenhouse gas emissions per unit of electrical energy stored in a hybrid electric vehicle battery is shown. In block 302, during recharging of a vehicle battery onboard the hybrid electric vehicle, the vehicle controller receives electrical energy GHG emissions information from a charging infrastructure at the electrical grid 114 (FIG. 1). The electrical energy GHG emissions information may include, for example, the greenhouse gas emissions per kilowatt-hour of energy stored in the onboard vehicle battery ($G_{Batt\_del}$) and the total quantity of energy stored in the battery ($E_{Batt\_del}$). In block 304, the average greenhouse gas emissions per unit electrical energy stored in the battery ($G_{Batt}$) is recalculated according to the formula:

$$G_{Batt\_post\_charge}=(G_{Batt\_pre\_charge}E_{Batt\_pre\_charge}+G_{Batt\_del}E_{Batt\_del})/E_{Batt\_pre\_charge}+E_{Batt\_del}$$

Referring next to FIG. 4, a flow diagram 400 which illustrates implementation of the energy management system during normal operation of a hybrid electric vehicle is shown. In block 402, a determination is made as to whether the state of charge (SOC) of the onboard vehicle battery is below the charge threshold. In the event that the SOC is not below the charge threshold, in block 404 the power demand of the vehicle is determined. This determination may be made according to the equation:

$$P_{demand}=P_{prop\_demand}+P_{acc\_demand}$$

In block 406, a determination is made as to which power setting of the prime mover of the hybrid electric vehicle minimizes the rate of greenhouse gas emissions according to the formula:

$$P_{demand}=P_{PM}+P_{batt\_dis}$$

The rate of greenhouse gas emissions is expressed by the equation:

$$G=(P_{PM})G_F/\psi_{pm}[P_{pm}]+(P_{batt\_dis})G_{batt}/\psi_{batt}[P_{batt\_dis},SOC]$$

Where $\psi_{pm}[P_{pm}]=P_{pm}/M_{fuel}[P_{pm}]$ is the prime mover power divided by prime mover fuel consumption rate, and $\psi_{batt\_dis}[P_{batt\_dis},SOC]=P_{batt\_dis}/E_{batt}[P_{batt\_dis},SOC]$ is the battery discharge power divided by energy depletion rate of the battery. Both of these can be stored as look-up tables for the specific hardware being used.

The constraint that prime mover and battery power must meet vehicle demand may be imposed by the equation:

$$G=(P_{PM})G_F/\psi_{pm}[P_{pm}]+(P_{demand}-P_{PM})G_{batt}/\psi_{batt}[P_{demand}-P_{PM},SOC]$$

The prime mover power is then set to the value that minimizes the previous function subject to maximum and minimum power constraints for the prime mover and the battery.

If $\psi_{pm}$ and $\psi_{batt\_dis}$ are relatively constant with respect to power, the following simple strategy will be very close to optimum. Calculate the following sensitivity:

$$dG/dP_{pm}=G_F/\psi_{pm}-G_{batt}/\psi_{batt}$$

If $dG/dP_{pm}>0$, the battery discharge power is set as high as possible and the FCS power is set as low as possible. If $dG/dP_{pm}<0$, the FCS power is set at the vehicle demand if possible and the battery power is used only to fill in when needed.

In block 408 of the flow diagram 400, the electrical energy content of the vehicle battery is updated. In block 410, steps 1-4 are repeated. In block 412, the vehicle power demand is determined. In block 414, the minimum charge rate required by the vehicle battery is determined. In block 416, the power setting of the prime mover which both meets vehicle demand and minimizes greenhouse gas emissions content of the electrical energy from the battery is determined:

$$\Delta G_{Batt} = [G_{Batt,i}E_{Batt,i} + G_{Fuel}(P_{Batt\_charge}/\psi_{Batt\_charge}\psi_{pm})] /$$
$$[E_{Batt,i} + (P_{Batt\_charge}/\psi_{Batt\_charge})\Delta T] - G_{Batt,i}$$
$$= [(P_{pm} - P_{dem})(G_{Fuel}/\psi_{pm}) - G_{Batt,i}\Delta T]/\psi_{Batt\_charge}E_{Batt,i} +$$
$$[(P_{PM} - P_{dem})/\psi_{Batt\_charge}]\Delta T$$
$$= (P_{pm} - P_{dem})G_{Fuel}/\psi_{Batt\_charge}\psi_{pm}E_{Batt,i}$$

This is minimized by choosing the value of $P_{pm}$ that minimizes $\psi_{Batt\_charge}(P_{pm}-P_{dem})\psi_{pm}(P_{pm})$.

In block 418, the electrical energy content of the battery and the average greenhouse gas emission content of the electrical energy stored in the battery are updated. In block 420, steps 1-9 are repeated.

In the event that the determination made in block 402 reveals that the battery SOC is below the charge threshold, then in block 404a the power level of the prime mover is set to meet vehicle demand and to a battery power charge rate that minimizes the average greenhouse gas emissions content per unit electrical energy stored in the battery.

During regeneration events, the same process applies as in normal operation of the hybrid electric vehicle which was heretofore described with respect to FIG. 4, but with, the following adjustments: when the vehicle battery is in a discharge mode and $dG/dP_{pm}>0$, regeneration energy is used to offset the battery discharge power and the FCS power is kept as low as possible. When $dG/dP_{pm}<0$, regeneration energy is used to offset the FCS power and battery power is used only to fill in when needed. When the battery is in charge mode, the value of $P_{pm}$ that maximizes $\psi_{Batt\_charge}(P_{pm}+P_{reg}-P_{dem})\psi_{pm}(P_{pm})$ is selected.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. An energy management system, comprising:
  a first energy source having a first well-to-wheels greenhouse gas emissions content;
  a second energy source having a second well-to-wheels greenhouse gas emissions content;
  a prime mover disposed in power communication with said first energy source;
  a power distribution and conversion mechanism disposed in electrical communication with said prime mover and said, second energy source;
  an electric drive mechanism drivingly engaged by said power distribution and conversion mechanism;
  a controller communicating with said first energy source, said second energy source and said power distribution and conversion mechanism; and
  wherein said controller is adapted to operate said electric drive mechanism using said first energy source when said first well-to-wheels greenhouse gas emissions content is less than said second well-to-wheels greenhouse gas emissions content and said controller is adapted to operate said electric drive mechanism using said second energy source when said second well-to-wheels greenhouse gas emissions content is less than said first well-to-wheels greenhouse gas emissions content.

2. The energy management system of claim 1 wherein said prime mover comprises an internal combustion engine.

3. The energy management system of claim 1 wherein said prime mover comprises a fuel cell.

4. The energy management system of claim 1 wherein said first energy source comprises an onboard fuel storage facility containing fuel.

5. The energy management system of claim 1 wherein said second energy source comprises a battery and electrical energy stored in said battery.

6. The energy management system of claim 5 further comprising an electrical grid connected to said battery.

7. The energy management system of claim 6 wherein said battery is adapted for plug-in connection to said electrical grid.

8. An energy management system for a hybrid electric vehicle, comprising:
  a first energy source having a first well-to-wheels greenhouse gas emissions content;
  a second energy source having a second well-to-wheels greenhouse gas emissions content;
  prime mover disposed in electrical communication with said first energy source;
  a power distribution and conversion mechanism disposed in electrical communication with said prime mover and said second energy source;
  an electric drive mechanism drivingly engaged by said power distribution and conversion mechanism;
  a vehicle controller communicating with said first energy source, said second energy source and said power distribution and conversion mechanism;
  wherein said vehicle controller is adapted to receive said first well-to-wheels greenhouse gas emissions content from said first energy source and said second well-to-wheels greenhouse gas emissions content from said second energy source; and
  wherein said vehicle controller is adapted to operate said electric drive mechanism using said first energy source when said first well-to-wheels greenhouse gas emissions content is less than said second well-to-wheels greenhouse gas emissions content and said controller is adapted to operate said electric drive mechanism using said second energy source when said second well-to-wheels greenhouse gas emissions content is less than said first well-to-wheels greenhouse gas emissions content.

9. The energy, management system of claim 8 wherein said prime mover comprises an internal combustion engine.

10. The energy management system of claim 8 wherein said prime mover comprises a fuel cell.

11. The energy management system of claim 8 wherein said first energy source comprises an onboard fuel storage facility containing fuel.

12. The energy management system of claim 8 wherein said second energy source comprises a vehicle battery and electrical energy stored in said vehicle battery.

13. The energy management system of claim 12 further comprising an electrical grid connected to said vehicle battery.

14. The energy management system of claim 13 wherein said vehicle battery is adapted for plug-in connection to said electrical grid.

15. The energy management system of claim 8 wherein said vehicle controller is adapted to use GPS and time information to estimate said second well-to-wheels greenhouse gas emissions content based on regional grid mix averages.

* * * * *